(12) United States Patent
Caruso et al.

(10) Patent No.: US 10,533,533 B2
(45) Date of Patent: Jan. 14, 2020

(54) MODULAR WIND TURBINE ROTOR BLADE CONSTRUCTED OF MULTIPLE RESIN SYSTEMS

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1078 days.

(21) Appl. No.: 14/835,989

(22) Filed: Aug. 26, 2015

(65) Prior Publication Data
US 2017/0058865 A1    Mar. 2, 2017

(51) Int. Cl.
F03D 1/06        (2006.01)
F03D 80/40       (2016.01)

(52) U.S. Cl.
CPC .......... *F03D 1/0675* (2013.01); *F03D 80/40* (2016.05)

(58) Field of Classification Search
CPC .... F03D 1/0675; F03D 80/40; F05D 2230/60; Y02E 10/721; Y02P 70/523
USPC .............................. 123/559.1; 416/230, 226
See application file for complete search history.

(56) References Cited

U.S. PATENT DOCUMENTS

| | | |
|---|---|---|
| 6,264,877 B1 | 7/2001 | Pallu De La Barriere |
| 8,317,479 B2 | 11/2012 | Vronsky et al. |
| 8,657,581 B2 | 2/2014 | Pilpel et al. |
| 8,673,106 B1 | 3/2014 | Jolley et al. |
| 8,747,098 B1 | 6/2014 | Johnson et al. |
| 8,961,142 B2 | 2/2015 | Wansink |
| 8,992,813 B2 | 3/2015 | Robbins et al. |

(Continued)

FOREIGN PATENT DOCUMENTS

| | | |
|---|---|---|
| CN | 101906251 | 8/2010 |
| JP | 2007-92716 | 4/2007 |

(Continued)

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

*Primary Examiner* — Mark A Laurenzi
*Assistant Examiner* — Paul W Thiede
(74) *Attorney, Agent, or Firm* — Dority & Manning, P.A.

(57) ABSTRACT

The present disclosure is directed to a method of manufacturing a modular rotor blade for a wind turbine. The method includes providing a plurality of resin systems for manufacturing a plurality of blade components for the modular rotor blade. Each of the resin systems includes at least one of a thermoset material or a thermoplastic material, optionally a fiber reinforcement material, and at least one additive. Thus, the method includes determining a resin system for each of the blade components based on a location and/or function of each blade component in the rotor blade. In addition, the method includes forming each of the blade components of the rotor blade from one of the plurality of resin systems and securing each of the blade components together to form the modular rotor blade.

17 Claims, 10 Drawing Sheets

(56) References Cited

U.S. PATENT DOCUMENTS

| | | |
|---|---|---|
| 2009/0148300 A1 | 6/2009 | Driver et al. |
| 2011/0097211 A1 | 4/2011 | Rudling |
| 2011/0142670 A1* | 6/2011 | Pilpel .................... F03D 3/062 |
| | | 416/230 |
| 2013/0164133 A1 | 6/2013 | Grove-Nielsen |
| 2014/0186188 A1* | 7/2014 | Takeuchi ............. F03D 1/0675 |
| | | 416/224 |
| 2014/0295187 A1 | 10/2014 | Jacobsen et al. |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 2/2015 |
| WO | WO 2015/015202 A1 | 2/2015 |

* cited by examiner

MODULAR WIND TURBINE ROTOR BLADE CONSTRUCTED OF MULTIPLE RESIN SYSTEMS

FIELD OF THE INVENTION

The present disclosure relates generally to wind turbines, and more particularly to modular wind turbine rotor blades constructed of multiple resin systems that are tailored based on the desired physical properties of each blade component.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Such rotor blades, however, are not without issues. For example, different blade components typically require different physical properties. More specifically, the blade root typically needs increased strength over the blade tip. Further, regions at the leading edge of the blade may need improved toughness for erosion protection. As such, conventional rotor blades must be constructed of materials that can withstand the highest anticipated loads of any single component. Unfortunately, such materials can be expensive and since conventional blades are typically constructed of two blade halves, the entire blade has to be constructed of the expensive material.

In addition, methods used to manufacture the rotor blades and/or structural components thereof can be difficult to control, defect prone, and/or highly labor intensive due to handling of the dry fabrics and the challenges of infusing large laminated structures. Moreover, as rotor blades continue to increase in size, conventional manufacturing methods continue to increase in complexity as the blade halves are typically manufactured using opposing mold halves that must be large enough to accommodate the entire length of the rotor blade. As such, joining the large blade halves can be highly labor intensive and more susceptible to defects.

One known strategy for reducing the complexity and costs associated with manufacturing rotor blades is to manufacture the rotor blades in blade segments. The blade segments may then be assembled to form the rotor blade. However, known blade segments are constructed similar to the blade halves and require complex interconnecting components to join the segments together. In addition, known joint designs do not provide for sufficient alignment of the blade segments, thereby increasing the amount of time needed to assemble the blade segments. Further, conventional segmented blades are typically heavier than conventional blades due to the additional joints and/or related parts.

Thus, the art is continuously seeking new and improved rotor blades methods of manufacturing same that address the aforementioned issues. Accordingly, the present disclosure is directed to modular wind turbine rotor blades constructed of multiple resin systems that are tailored based on the desired physical properties of each blade component.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method of manufacturing a modular rotor blade for a wind turbine. The method includes providing a plurality of resin systems for manufacturing a plurality of blade components for the modular rotor blade. Each of the resin systems includes at least one of a thermoset material or a thermoplastic material and optionally at least one of a fiber reinforcement material or at least one additive. Thus, the method includes determining a resin system for each of the blade components based on a location and function of each blade component in the rotor blade. In addition, the method includes forming each of the blade components of the rotor blade from one of the plurality of resin systems and securing each of the blade components together to form the modular rotor blade.

In one embodiment, the blade components may include any suitable blade component, including but not limited to a plurality of blade segments, a blade root section, a blade tip section, one or more continuous spar caps, one or more shear webs, an additional structural component secured to the blade root section and configured within the plurality of blade segments, or similar. Thus, in certain embodiments, the step of determining the resin system for each of the blade components based on the location and function of each blade component in the rotor blade may include tailoring the resin system for each of the blade components based on a desired strength of the blade component.

More specifically, in particular embodiments, the step of forming each of the blade components of the rotor blade from one of the plurality of resin systems may include forming, at least in part, a first set of the blade segments from a thermoset material, forming, at least in part, a second set of the blade segments from a thermoplastic material, and arranging the first set of blade segments (e.g. which may be constructed of epoxy) closer to a blade root of the rotor blade and arranging the second set of blade segments (e.g. which may be constructed of polyester) closer to a blade tip of the rotor blade. Thus, panel resin toughness may increase from tip to root with the root having higher resin toughness than the tip. Higher resin toughness improves fatigue resistance and reduces fatigue damage towards the root. In addition, the first and/or second sets of blade segments may also be constructed, at least in part, of a fiber reinforcement material.

In particular embodiments, the additive(s) of the resin systems may include any one of or a combination of the following: a colorant or pigment, an ultraviolet (UV) barrier (e.g. a UV stabilizer, antioxidant, or film), an erosion resistance agent, a de-icing agent, a conductivity agent, a nucleating agent, a mold release agent, a lubricant, a sealant, a heat stabilizer, a toughening agent, a plasticizer, a bonding agent (e.g. an organic silane compound), an antimicrobial, a filler, a flame retardant, a smoke retardant or any other suitable additive or combinations thereof. Thus, the additive(s) can be tailored for each of the resin systems depending on which blade component is being manufactured. For example, in certain embodiments, the step of determining the resin system for each of the blade components based on the location and function of each blade component in the rotor blade may further include adding at least one of the additives (e.g. the colorant, the UV barrier, the de-icing agent, and/or the erosion resistance agent) to the resin system for at least one of the plurality of blade segments and/or the blade root section.

More specifically, in particular embodiments, the plurality of blade segments may include at least one of a pressure side segment, a suction side segment, a leading edge blade segment, a trailing edge segment, a non-jointed segment, a J-shaped blade segment, or a single-jointed segment. Thus, in such embodiments, the step of determining the resin system for each of the blade components based on the location and function of each blade component in the rotor blade may include adding the erosion resistance agent to a resin system for at least one of the leading edge blade segments, the pressure side segment, and/or the suction side segment.

In additional embodiments, the method may also include forming one or more of the blade components with regions having less volume of the fiber reinforcement material or absent of the fiber reinforcement material. Thus, in such embodiments, the regions may be configured to improve bonding or welding of the blade components to each other.

In further embodiments, the method may also include forming the one or more spar caps from a first resin system and forming the one or more shear webs from a second resin system. More specifically, in certain embodiments, the first resin system may include a less-expensive thermoset material having a low density, whereas the second resin system may include a durable thermoplastic material reinforced with a fiber material and having at least one additive.

In yet another embodiment, the step of securing each of the blade components together to form the modular rotor blade may include at least one of welding or bonding the blade components together to form the modular rotor blade.

In another aspect, the present disclosure is directed to a modular rotor blade for a wind turbine. The modular rotor blade includes a plurality of blade components constructed from multiple resin systems. Each of the resin systems may include at least one of a thermoset material or a thermoplastic material and optionally at least one of a fiber reinforcement material or at least one additive. Further, the blade components include, at least, a blade root section, a blade tip section, at least one blade segment arranged between the blade root section and the blade tip section, opposing spar caps configured on opposing internal surfaces of the at least one blade segment, and one or more shear webs configured between the opposing spar caps. In addition, the resin system for each of the blade components is determined based on a location and function of the blade component in the rotor blade.

In yet another aspect, the present disclosure is directed to a modular rotor blade for a wind turbine. The modular rotor blade includes a main blade structure constructed, at least in part, from at least one of a thermoset or a thermoplastic material, and a plurality of blade segments configured with the main blade structure. The plurality of blade segments are constructed of multiple resin systems that are determined based on a location and function of each blade segment in the rotor blade. Further, each of the resin systems includes a thermoset material or a thermoplastic material, a fiber reinforcement material, and at least one additive.

In another embodiment, the additive(s) of the resin systems may include any one of or a combination of the following: a colorant or pigment, an ultraviolet (UV) barrier (e.g. a UV stabilizer, antioxidant, or film), an erosion resistance agent, a de-icing agent, a conductivity agent, a nucleating agent, a mold release agent, a lubricant, a sealant, a heat stabilizer, a toughening agent, a plasticizer, a bonding agent (e.g. an organic silane compound), an antimicrobial, a filler, a flame retardant, a smoke retardant or any other suitable additive or combinations thereof. Thus, in certain embodiments, the rotor blade may include a first set of the blade segments constructed, at least in part, of a thermoplastic material and a second set of the blade segments constructed, at least in part, of a thermoset material, wherein the first set of blade segments are located closer to a blade root and the second set of blade segments are located closer to a blade tip.

In further embodiments, one or more of the blade segments may include regions having less volume of the fiber reinforcement material or absent of the fiber reinforcement material. Thus, in such embodiments, the regions are configured to improve bonding or welding of the blade segments to each other and/or to the main blade structure. More specifically, in certain embodiments, the main blade structure may include at least one of a blade root section, a blade tip section, one or more continuous spar caps, one or more shear webs, an additional structural component secured to the blade root section and configured within the at least one blade segment, or similar.

In additional embodiments, the fiber reinforcement material may include at least one of glass fibers, carbon fibers, polymer fibers, ceramic fibers, nanofibers, metal fibers, or similar. In further embodiments, the plurality of blade segments may include at least one of a pressure side segment, a suction side segment, a leading edge segment, a trailing edge segment, a non-jointed segment, a J-shaped blade segment, a single-jointed segment, or similar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 14 illustrates a plurality of blade segments according to the present disclosure; and, FIG. 15 illustrates a plurality of blade segments and a blade root section unassembled according to the present disclosure, particularly illustrating blade segments constructed, at least in part, of regions having less volume of the fiber reinforcement material or absent of the fiber reinforced material.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a modular rotor blade for a wind turbine having regions of tailored resin properties and methods of manufacturing same. More specifically, the resin systems of the rotor blades may be tailored during the manufacturing process to obtain desired performance characteristics. For example, the modular rotor blade may include a plurality of blade components, e.g. a blade root section, a blade tip section, a plurality of blade segments or panels, one or more spar caps, and/or one or more shear webs, with each blade component being constructed of a different resin system that is tailored based on location and/or function of the blade component in the rotor blade. Further, the resin systems may include a thermoset material, a thermoplastic material, and/or combinations thereof, as well as one or more fiber reinforcement materials and one or more additives. Thus, the modular rotor blade can be easily tailored to account for the varying physical properties of various blade components.

The present disclosure provides many advantages not present in the prior art. For example, the present disclosure provides a modular rotor blade constructed of multiple resin systems containing one or more additives that can be tailored by component to obtain desired performance characteristics. In addition, the resin systems of the rotor blade components can be tailored to simplify the manufacturing process. Thus, the modular rotor blades as described herein may reduce costs, labor time, repair time, and/or assembly cycle time of rotor blade production. Accordingly, the modular rotor blades and methods of manufacturing same of the present disclosure provide an economic alternative to conventional rotor blades.

Figure 1:
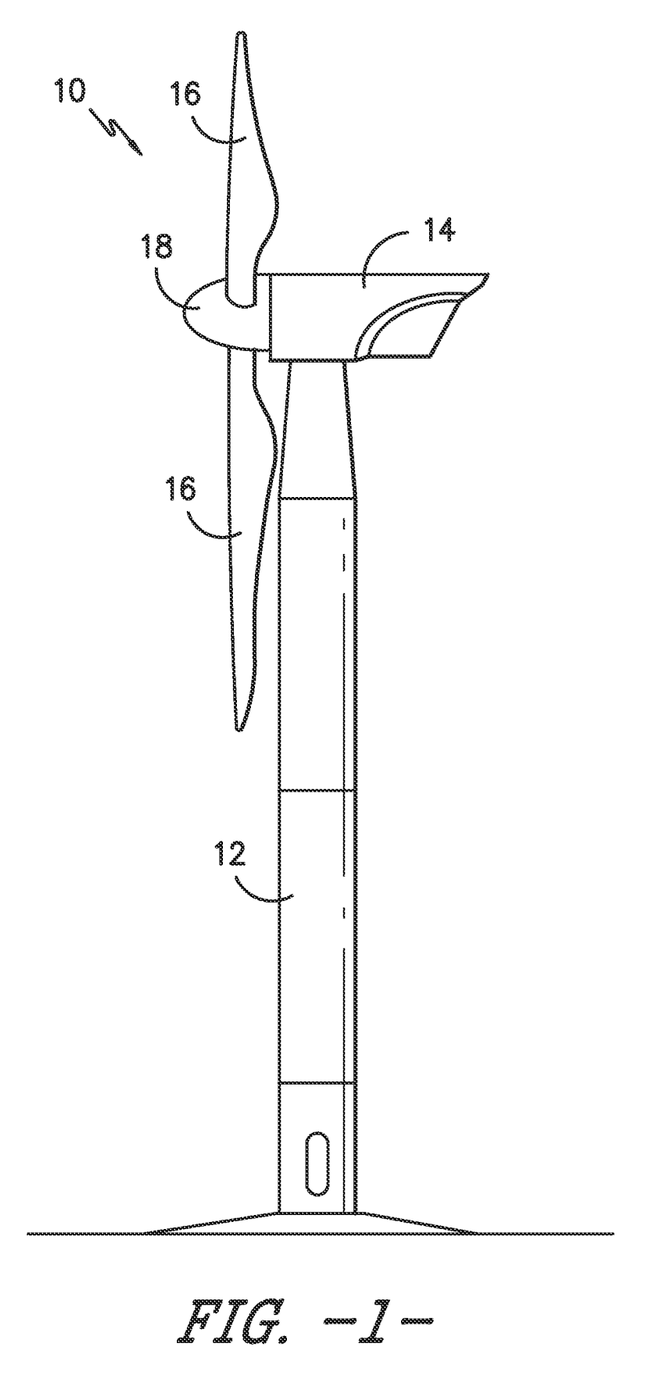
FIG. 1 illustrates a perspective view of one embodiment of a wind turbine according to the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Figure 2:
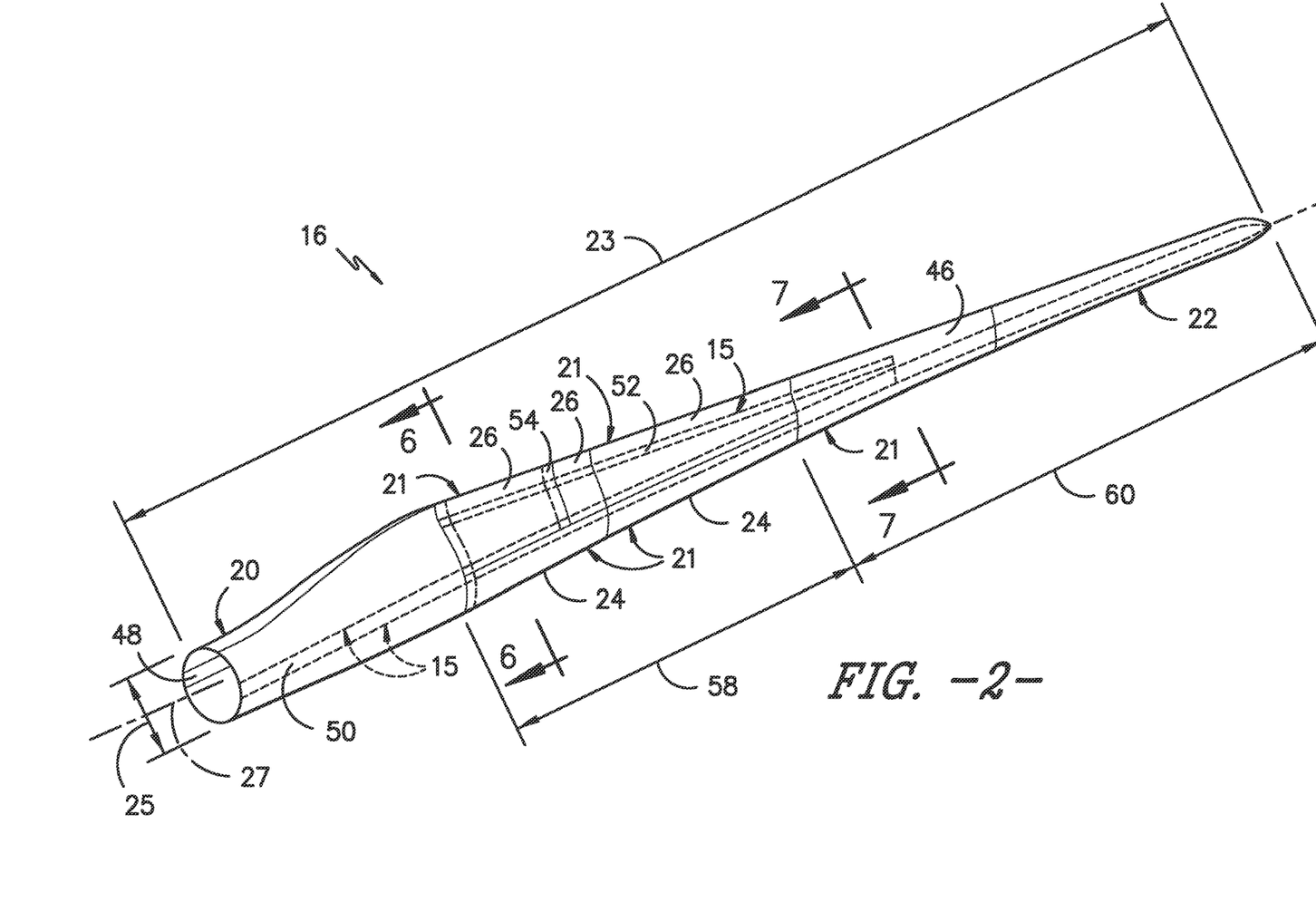
FIG. 2 illustrates a perspective view of one embodiment of a modular rotor blade of a wind turbine according to the present disclosure.
Figure 3:
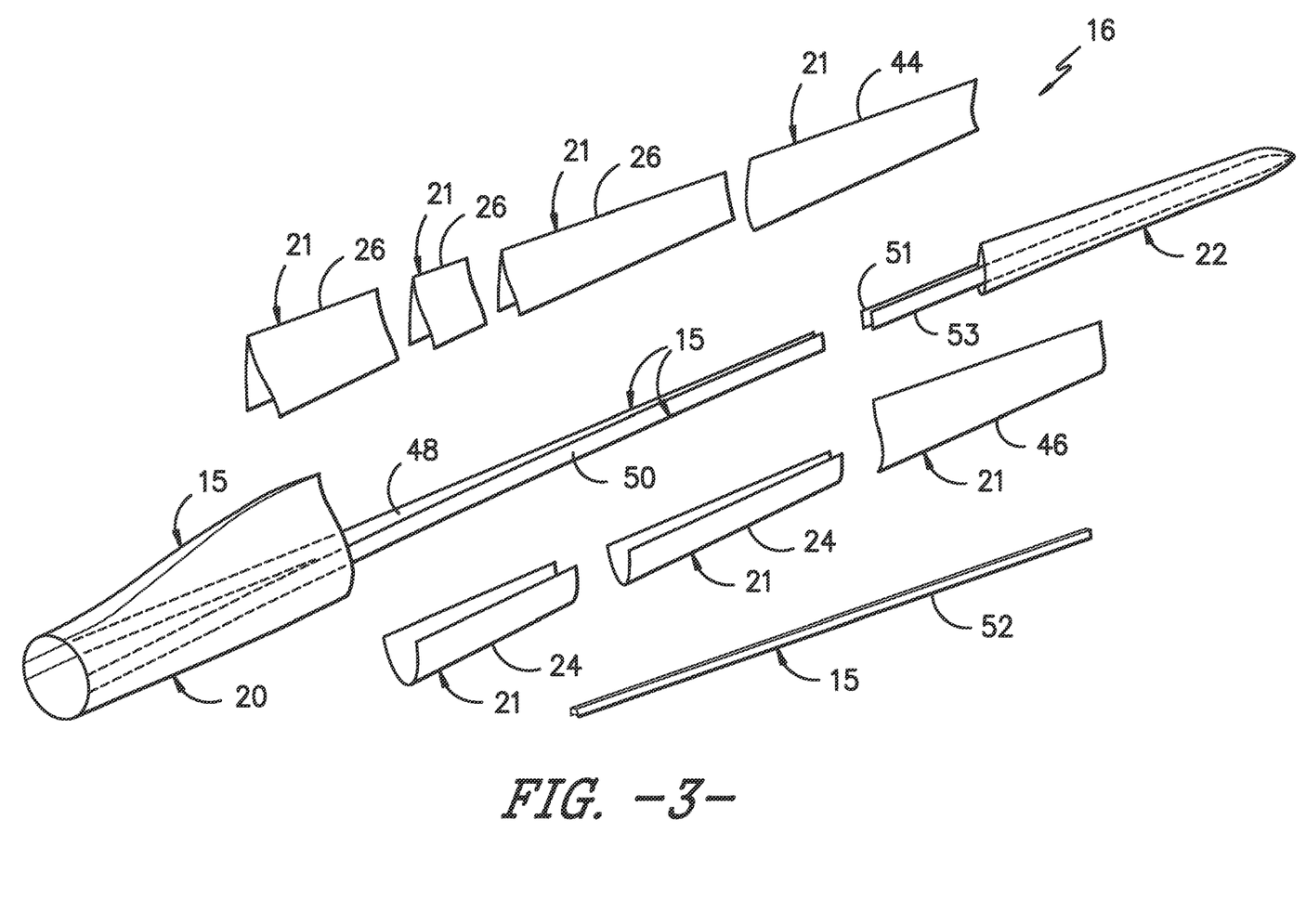
FIG. 3 illustrates an exploded view of the modular rotor blade of FIG. 2.

Referring now to FIGS. 2 and 3, various views of a modular rotor blade 16 according to the present disclosure are illustrated. More specifically, FIG. 2 illustrates a perspective view of one embodiment of a modular rotor blade 16 of a wind turbine 10 according to the present disclosure, whereas FIG. 3 illustrates an exploded view of the modular rotor blade of FIG. 2 to further illustrate the various blade components. Thus, the individual blade components may be constructed from multiple resin systems. More specifically, the resin systems may include a thermoset material or a thermoplastic material and optionally a fiber reinforcement material and/or one or more additives. Thus, the resin system for each of the blade components may be determined based on a location and function of the blade component in the rotor blade 16, which will be described in more detail below. Further, as shown, the blade components may include but are not limited to a main blade structure 15 and a plurality of blade segments 21 configured with the main blade structure 15.

More specifically, as shown, the main blade structure 15 may include any one of or a combination of the following blade components: a blade root section 20, a blade tip section 22, one or more continuous spar caps 48, 50, 51, 53, one or more shear webs 35 (FIGS. 6-7), an additional structural component 52 secured to the blade root section 20, and/or any other suitable structural component of the rotor blade 16.

Figure 6:
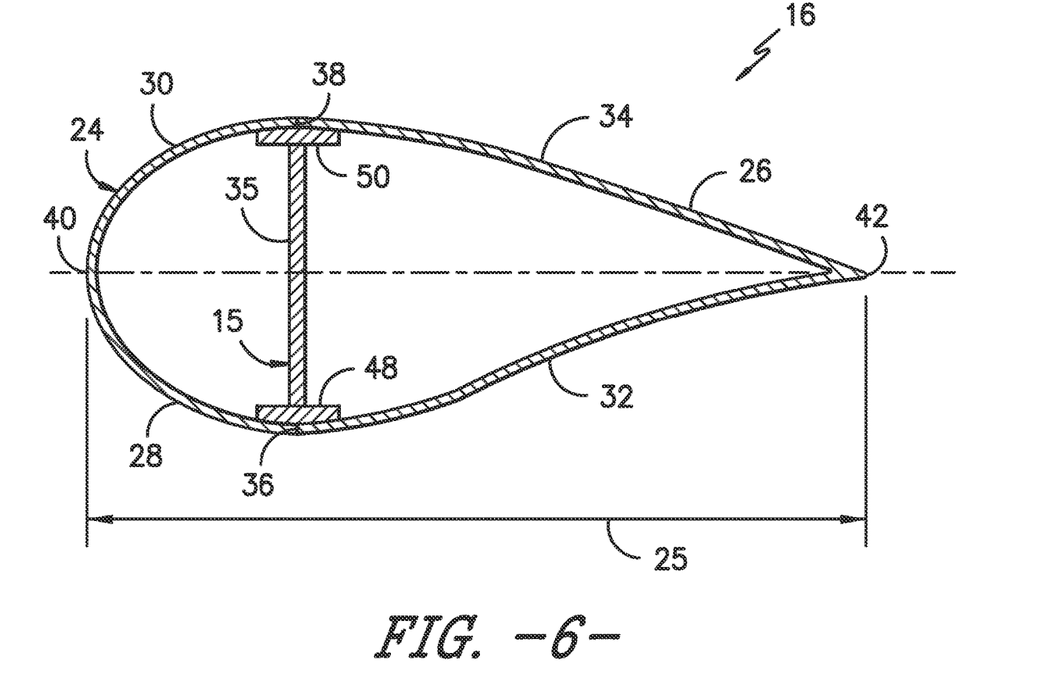
FIG. 6 illustrates a cross-sectional view of the modular rotor blade of FIG. 2 according to the present disclosure along line 6-6.

In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

Figures 14, 15:
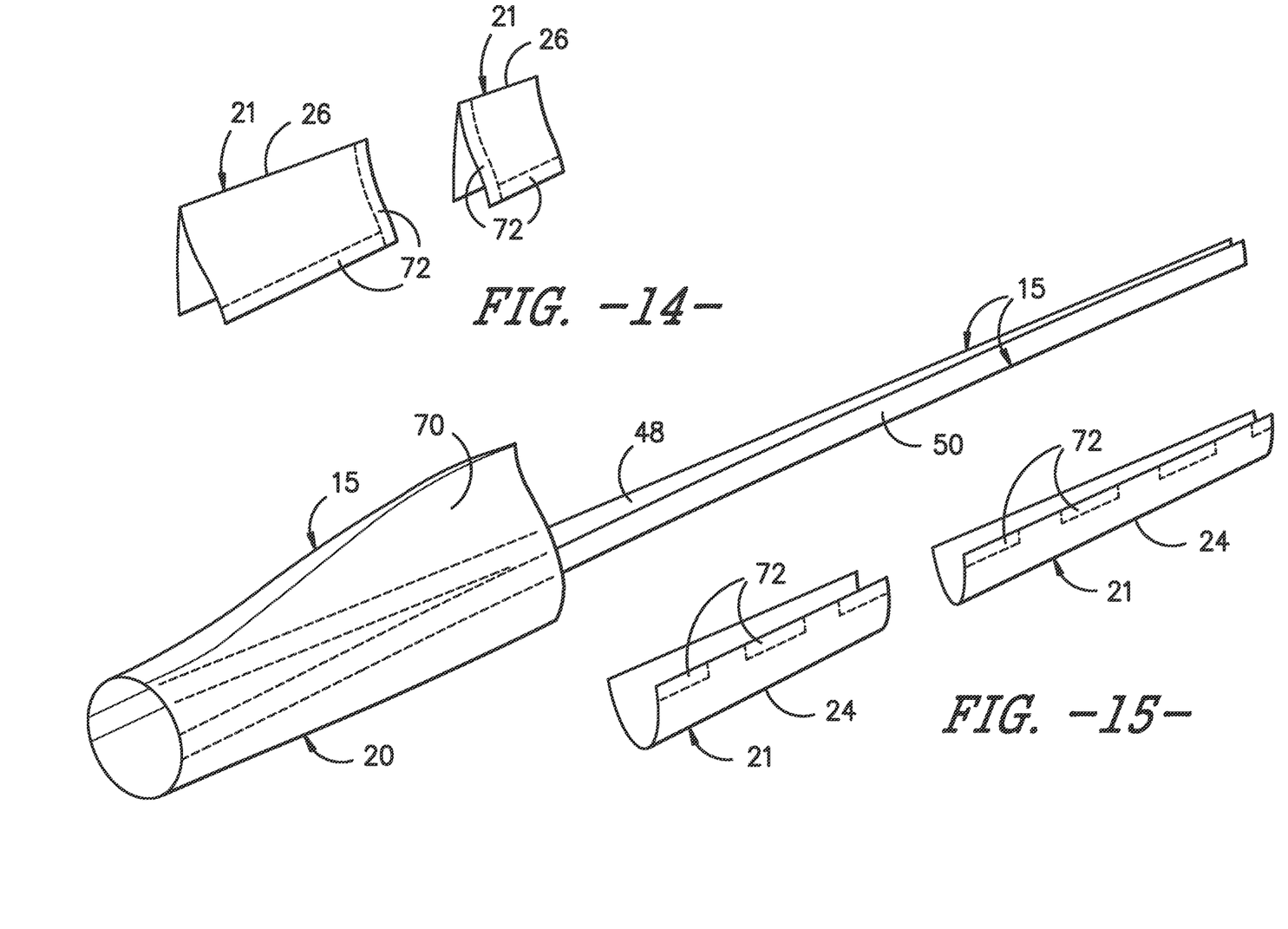

In specific embodiments, as shown in FIGS. 2-3 and 6-7, the main blade structure 15 may include the blade root section 20 with one or more longitudinally extending spar caps 48, 50 infused therewith and extending in a generally span-wise direction. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety. In such an embodiment, as shown in FIGS. 2-3 and 15, the blade root section 20 and the spar caps 48, 50 may be manufactured (e.g. infused) in a single shot or mold from a tailored resin system so as to produce a uniform, integral part having predetermined physical properties. Thus, the blade root section 20 is configured to be mounted or otherwise secured to the rotor 18 (FIG. 1). Similarly, the main blade structure 15 may include the blade tip section 22 with one or more longitudinally extending spar caps 51, 53 infused therewith. Thus, like the blade root section 20, the blade tip section 22 and the one or more spar caps 51, 53 may be manufactured in a single shot from a tailored resin system so as to produce a uniform, integral part having predetermined physical properties.

In addition, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In alternative embodiments, the continuous spar cap(s) 48, 50, 51, 53 may be joined or pre-formed with the blade segment(s) 21, e.g. before being joined to the blade root section 20 and/or the blade tip section 22. In such embodiments, the blade segment(s) 21 may be secured to the spar caps 48, 50, 51, 53 via welding, an adhesive, or one or more mechanical fasteners, e.g. depending on the materials of the spar cap(s) 48, 50, 51, 53 and the blade segment(s) 21 which will be discussed in more detail below.

It should be understood that the spar caps 48, 50, 51, 53 may be constructed of any suitable resin system, including, e.g. a thermoplastic material, a thermoset material, or similar, or combinations thereof, as well as a fiber reinforcement material and/or additives. For example, in certain embodiments, one or more of the spar caps 48, 50, 51, 53 may be constructed of a low-cost resin material, e.g. a thermoset polymer optionally reinforced with one or more fiber materials. In further embodiments, a thermoplastic resin (also optionally reinforced with a fiber material) may be infused around at least a portion of the already-cured thermoset spar caps. Thus, in such an embodiment, the thermoplastic resin system is configured to coat the spar cap so as to allow subsequent welding procedures to take place during assembly of the rotor blade 16 (e.g. to allow the thermoplastic blade segments 21 to be welded to one or more of the spar caps 48, 50, 51, 53). Further, the thermoplastic resin may encapsulate the entire spar cap or only certain regions of the spar cap to allow subsequent welding with other blade components. Moreover, such regions may be broken up by span or chord-wise directions and do not necessarily have to be continuous. In still additional embodiments, the spar caps 48, 50, 51, 53 may be constructed entirely of a thermoplastic material or entirely of a thermoset material.

In addition, in certain embodiments, the spar caps 48, 50, 51, 53 may be pultruded from thermoplastic or thermoset materials. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Figure 7:
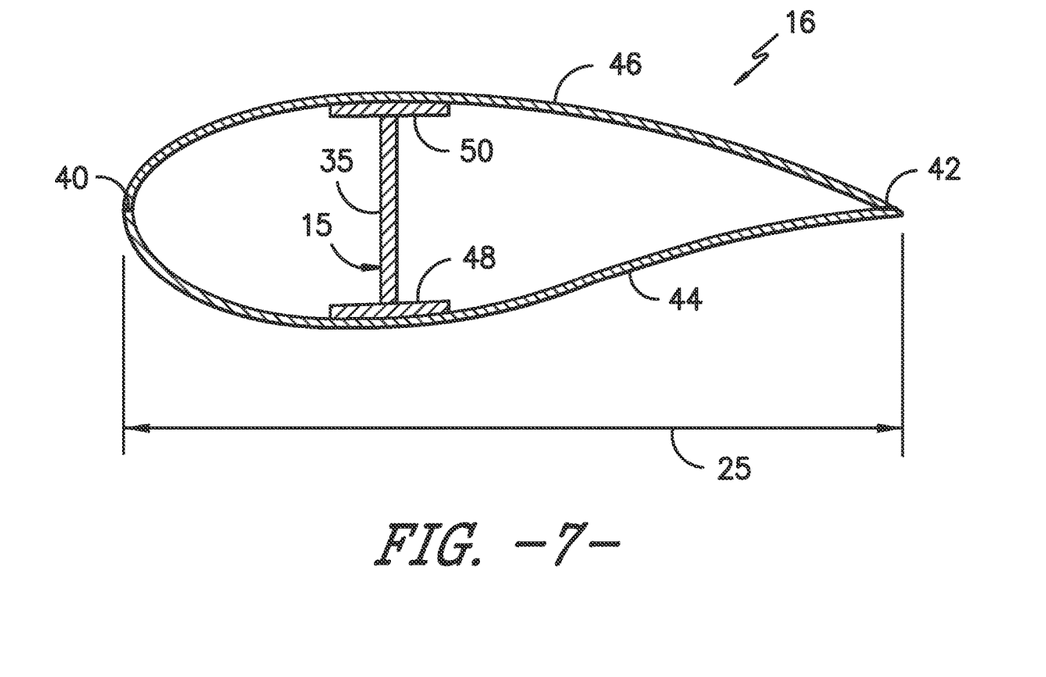
FIG. 7 illustrates a cross-sectional view of the modular rotor blade of FIG. 2 according to the present disclosure along line 7-7.
Figure 8:
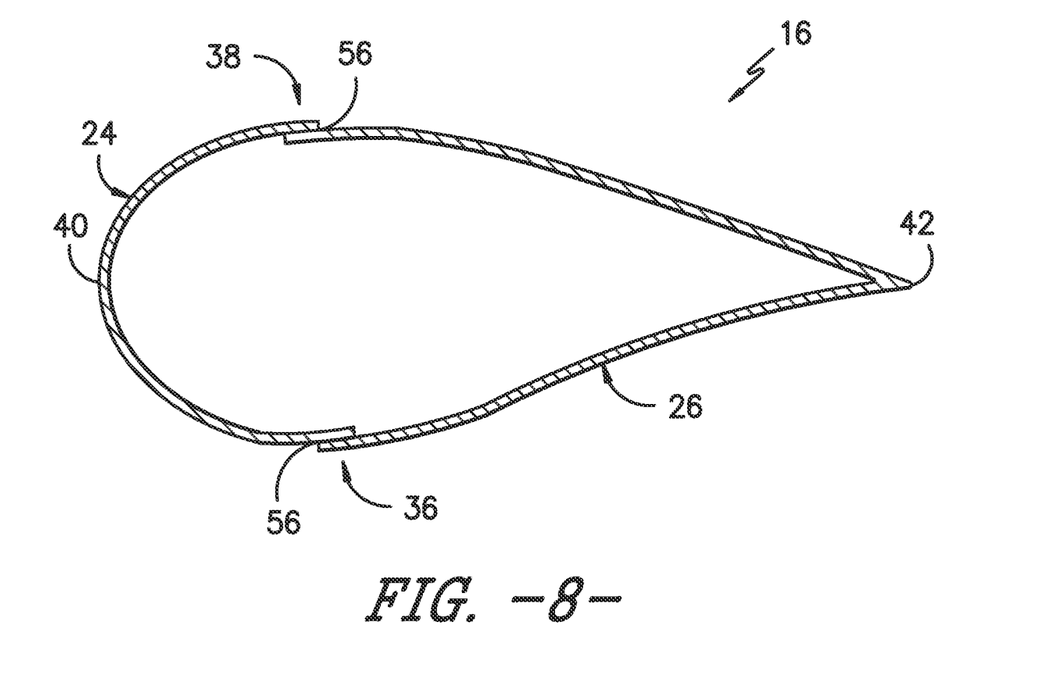
FIG. 8 illustrates a cross-sectional view of another embodiment of a modular rotor blade according to the present disclosure, particularly illustrating a blade segment having overlapping pressure and suction side seams.

Referring now to FIGS. 6-7, the main blade structure 15 may include one or more shear webs 35 configured between the one or more spar caps 48, 50, 51, 53. More particularly, the shear web(s) 35 may be configured to increase the rigidity of the blade segments 21, the blade root section 20, and/or the blade tip section 22. Further, the shear web(s) 35 may be configured to close out the blade root section 20. In certain embodiments, the resin system of the spar caps 48, 50, 51, 53 and/or the shear webs 35 may be tailored so as to provide the required strength and/or stiffness of the rotor blade 16 while also minimizing costs. For example, the shear webs 35 typically depend more on matrix strength than the spar caps 48, 50, 51, 53. Thus, in certain embodiments, the shear web 35 may be constructed from a first resin system, whereas the spar caps 48, 50, 51, 53 may be constructed from a second resin system. More specifically, the shear web 35 may be constructed, at least in part, from a durable thermoplastic material reinforced with a fiber material and having at least one additive as described below, whereas the spar caps 48, 50, 51, 53 may be constructed, at least in part, of a less expensive resin system, e.g. a polyester thermoset material, having a lower density to save cost and/or weight. Alternatively, the shear web 35 may be constructed, at least in part, from a thermoset resin such as epoxy or polyurethane, whereas the spar caps 48, 50, 51, 53 may be constructed, at least in part, of a less expensive resin system, e.g. a polyester thermoset material, having a lower density to save cost and/or weight.

In addition, as shown in FIGS. 2 and 3, the main blade structure 15 may also include an additional structural component 52 secured to the blade root section 20 and extending in a generally span-wise direction. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 24, 26 can be mounted thereto.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Referring particularly to FIGS. 2-12, any number of blade segments 21 having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable resin systems, including but not limited to a thermoset material or a thermoplastic material optionally reinforced with one or more fiber materials as well as one or more additives. More specifically, as generally shown in the figures, the blade segments 21 may include any one of or combination of the following blade segments: pressure and/or suction side segments 44, 46, (FIG. 7), leading and/or trailing edge segments 24, 26 (FIGS. 4-6 and 8), a non-jointed segment 45 (FIG. 9), a single-jointed segment 55 (FIG. 10), a multi-jointed blade segment (FIG. 11), a J-shaped blade segment 59 (FIG. 12), or similar.

Figure 4:
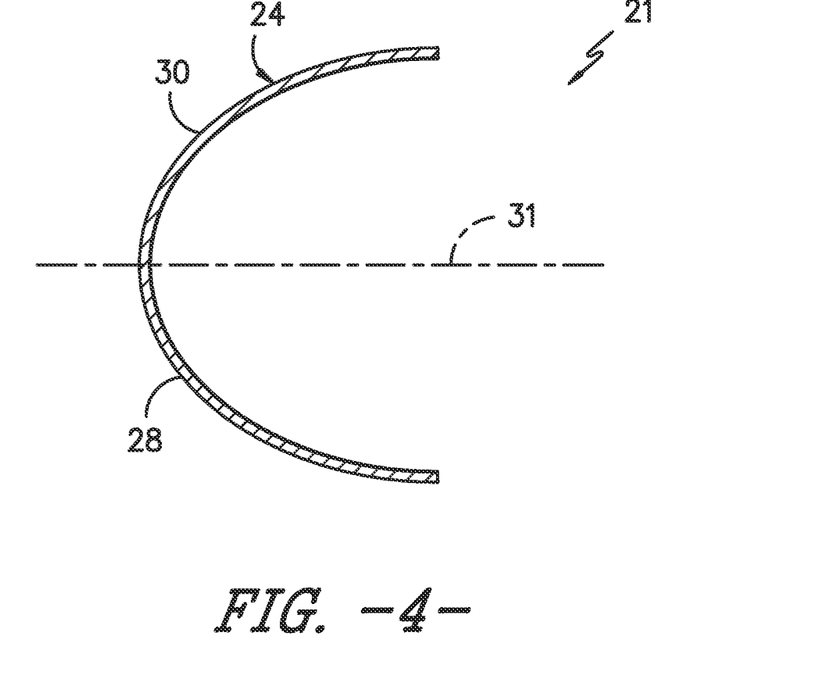
FIG. 4 illustrates a cross-sectional view of one embodiment of a leading edge segment of a modular rotor blade according to the present disclosure.
Figure 5:
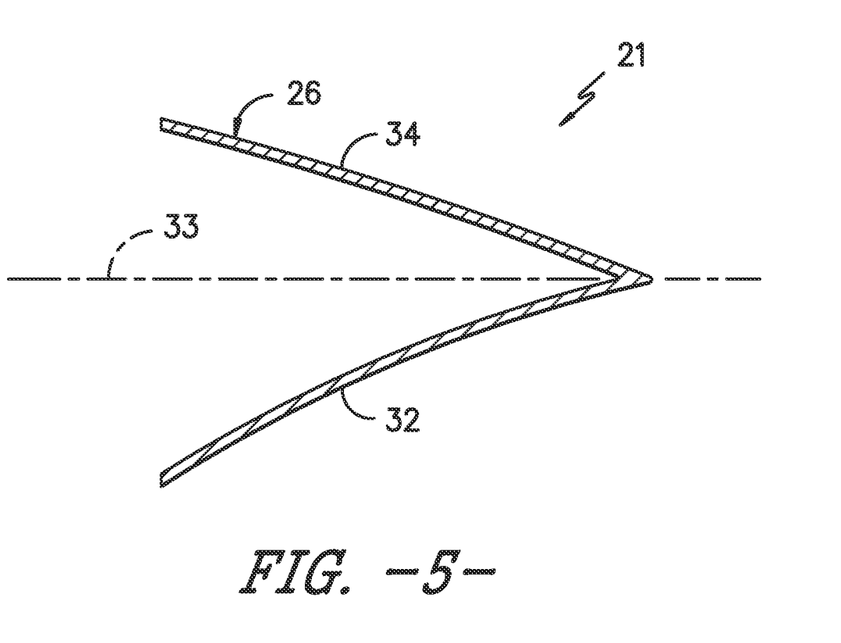
FIG. 5 illustrates a cross-sectional view of one embodiment of a trailing edge segment of a modular rotor blade according to the present disclosure.

More specifically, as shown in FIG. 4, the leading edge segments 24 may have a forward pressure side surface 28 and a forward suction side surface 30. Similarly, as shown in FIG. 5, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16. In addition, as particularly shown in FIGS. 6 and 8, the leading edge segment(s) 26 and the trailing edge segment(s) 26 may be joined at a pressure side seam 36 and a suction side seam 38. For example, as shown particularly in FIG. 8, the blade segments 24, 26 may be configured to overlap at the pressure side seam 36 and/or the suction side seam 38. Further, as shown in FIG. 2, adjacent blade segments 24, 26 may be configured to overlap at a seam 54. Thus, where the blade segments are constructed of a thermoplastic material, adjacent blade segments 21 can be welded together along the seams 36, 38, 54. Alternatively, in certain embodiments, the various segments of the rotor blade 16 may be secured together via an adhesive or mechanical fasteners configured between the overlapping leading and trailing edge segments 24, 26 and/or the overlapping adjacent leading or trailing edge segments 24, 26.

Figure 9:
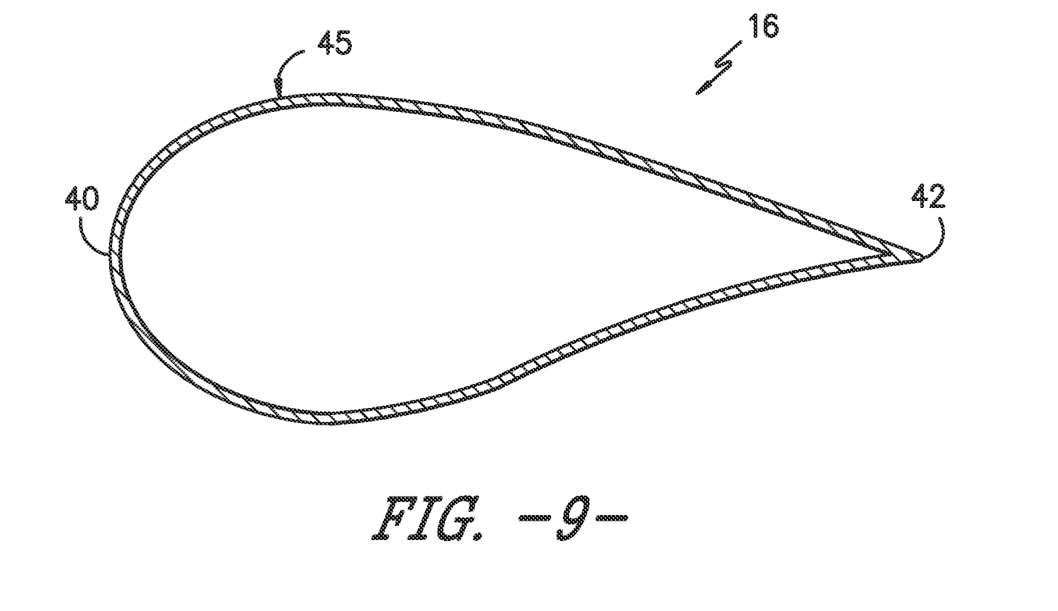
FIG. 9 illustrates a cross-sectional view of another embodiment of a modular rotor blade according to the present disclosure, particularly illustrating a non-jointed, continuous blade segment.
Figure 10:
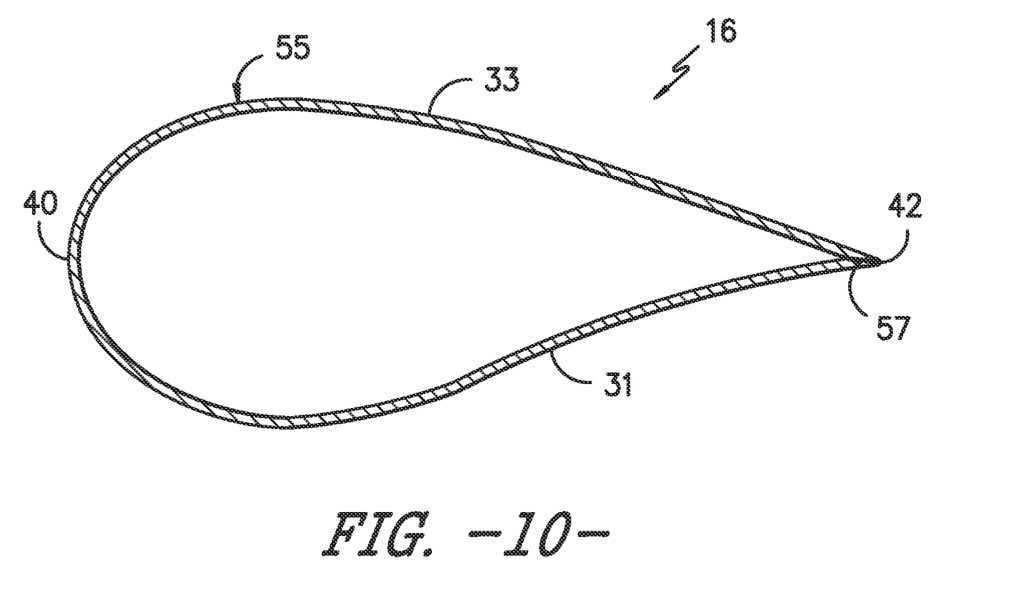
FIG. 10 illustrates a cross-sectional view of another embodiment of a modular rotor blade according to the present disclosure, particularly illustrating a single-jointed blade segment.

As shown in FIG. 9, the rotor blade 16 may also include a non-jointed, continuous blade surface 45, e.g. constructed at least in part of a thermoplastic material. Thus, as shown, the non-jointed, continuous blade surface 45 does not require bonding of multiple chord-wise segments. Alternatively, as shown in FIG. 10, the rotor blade 16 may also include a blade segment having a single-jointed blade surface 55. More specifically, as shown, the single-jointed blade surface 55 may include a pressure side surface 33, a suction side surface 31, and a single joint 57 at the trailing edge 42. Thus, the single-jointed blade surface 55 only requires one joint instead of multiple joints. Such blade segment(s) 21 can be easily mounted to the main blade structure 15, e.g. by separating the pressure and suction side surfaces 31, 33 at the single joint 57, mounting the continuous blade segment 55 over the one or more spar caps 48, 50, and securing the continuous blade segment 55 to the one or more spar caps 48, 58 between the blade root section 20 and the blade tip section 22, e.g. by welding the pressure and suction side surfaces 31, 33 at the single joint 57 and welding the blade segment 55 to the one or more spar caps 48, 50.

Figure 11:
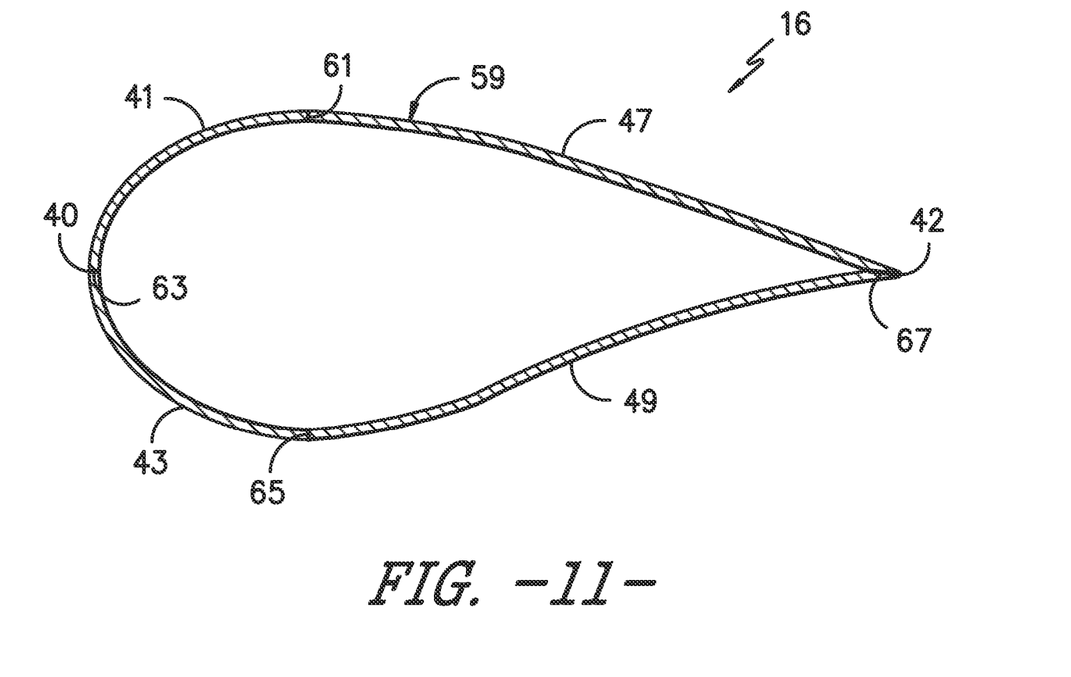
FIG. 11 illustrates a cross-sectional view of another embodiment of a modular rotor blade according to the present disclosure, particularly illustrating a plurality of blade segments joined together via multiple joints.
Figure 12:
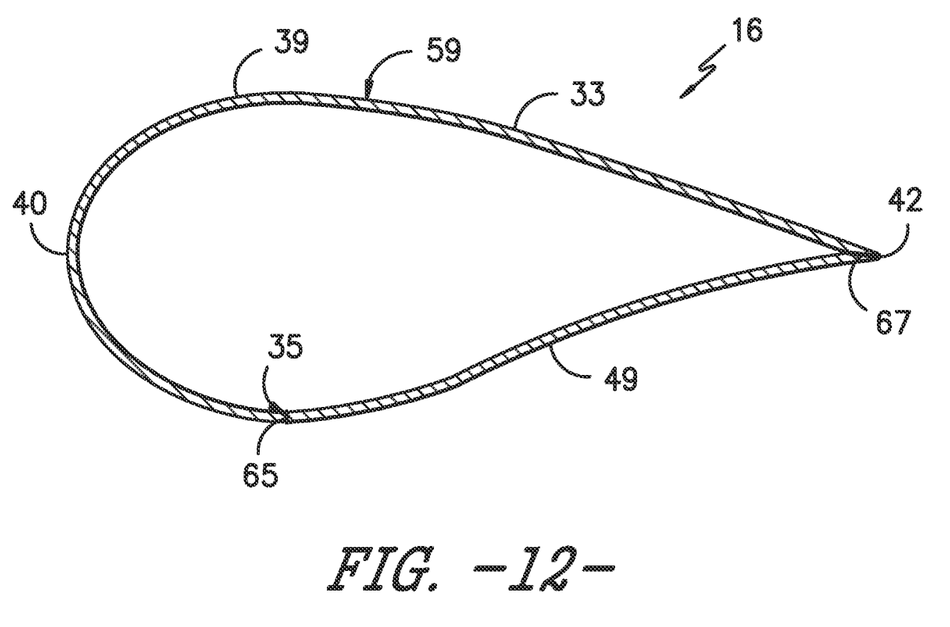
FIG. 12 illustrates a cross-sectional view of another embodiment of a modular rotor blade according to the present disclosure, particularly illustrating a plurality of blade segments joined together via multiple joints.

Moreover, as shown in FIGS. 11 and 12, the rotor blade 16 may also include a multi-jointed blade surface 59. More specifically, as shown in FIG. 11, the multi-jointed blade surface 59 may include a plurality of segments 41, 43, 47, 49 joined together via multiple joints 61, 63, 65, 67 spaced about the cross-section of the blade segment 59. For example, as shown, the segments 41, 43, 47, 49 may include a forward pressure side segment 43, a forward suction side segment 41, an aft pressure side segment 49, and an aft suction side segment 47. In another embodiment, as shown in FIG. 12, the blade segment 59 may include a generally J-shaped blade segment 39 and an additional blade segment, e.g. aft pressure side segment 49 or aft suction side segment 47, joined together via joints 65 and 67. More specifically, as shown, the J-shaped blade segment 39 may extend from the trailing edge 42 around the suction side surface 33 to a pressure side seam 35. In certain embodiments, such multi-jointed blade segments may be joined together, e.g. via welding, when the blade segments are constructed, at least in part, of a thermoplastic material.

Figure 13:
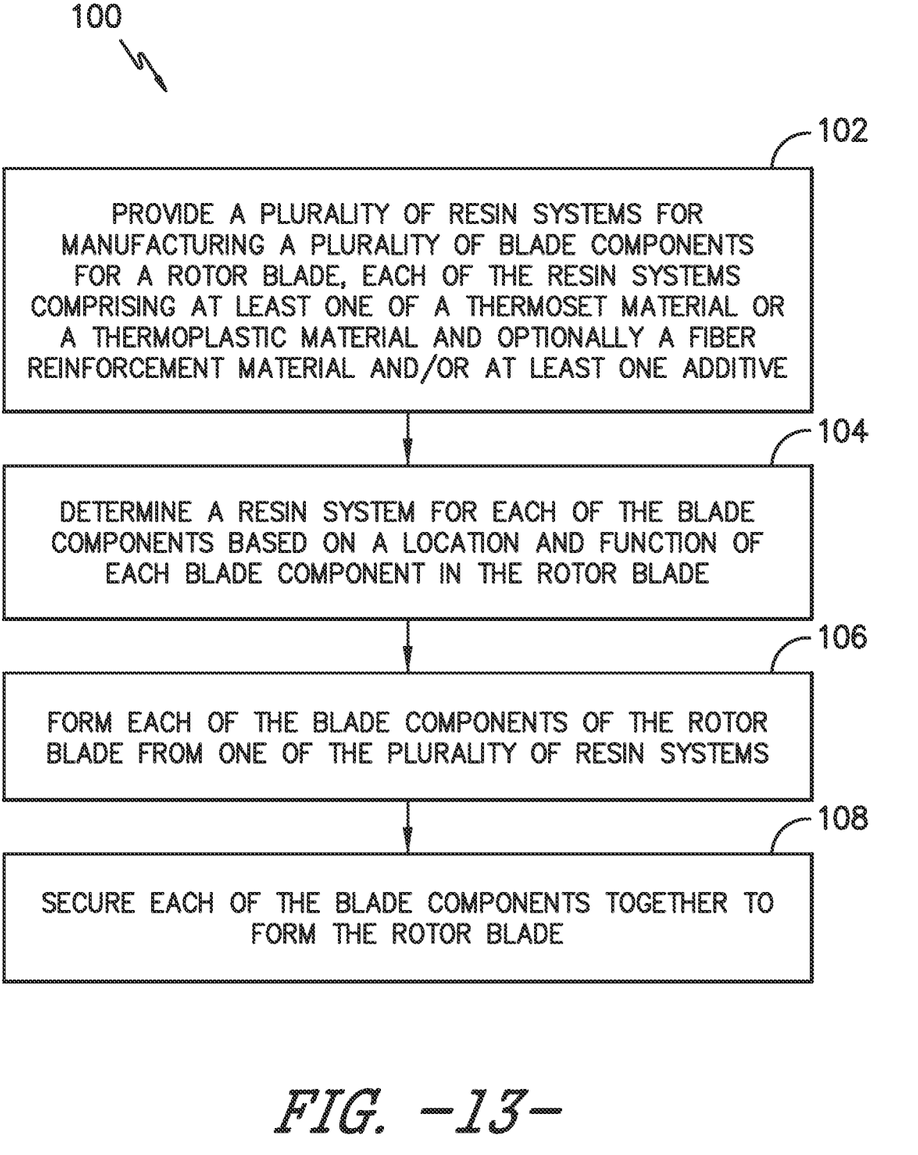
FIG. 13 illustrates a flow diagram of one embodiment of a method for manufacturing a modular rotor blade according to the present disclosure.

Referring now to FIG. 13, a flow diagram of one embodiment of a method 100 for manufacturing a modular rotor blade 16 according to the present disclosure is illustrated. As shown at 102, the method 100 includes providing a plurality of resin systems for manufacturing a plurality of blade components for the modular rotor blade 16. As mentioned, the blade components may include any suitable blade component, including but not limited to the blade segments 21, the blade root section 20, the blade tip section 22, one or more spar caps 48, 50, 51, 53, one or more shear webs 35, an additional structural component 52, or similar. More specifically, each of the resin systems may include a thermoset material or a thermoplastic material, an optional fiber reinforcement material, and at least one additive. The fiber reinforcement material may include but is not limited to glass fibers, carbon fibers, polymer fibers, ceramic fibers, nanofibers, metal fibers, or similar or combinations thereof. In addition, the direction of the fibers may include biaxial, unidirectional, triaxial, or any other another suitable direction and/or combinations thereof. Further, the fiber content may vary depending on the stiffness required in the corresponding blade component, the region or location of the blade component in the rotor blade 16, and/or the desired weldability of the component. In addition, the additive(s) for the resin systems described herein may include any one of or a combination of the following: a colorant or pigment, an ultraviolet (UV) barrier (e.g. a UV stabilizer, antioxidant, or film), an erosion resistance agent, a de-icing agent, a conductivity agent, a nucleating agent, a mold release agent, a lubricant, a sealant, a heat stabilizer, a toughening agent, a plasticizer, a bonding agent (e.g. an organic silane compound), an antimicrobial, a filler, a flame retardant, a smoke retardant or any other suitable additive, or combinations thereof.

Thus, as shown at 104, the method 100 includes determining a resin system for each of the blade components based on a location and/or function of each blade component of the rotor blade 16. More specifically, in certain embodiments, the step of determining the resin system for each of the blade components based on the location and/or function of each blade component in the rotor blade 16 may include tailoring the resin system for each of the blade components depending on which blade component is being manufactured. Further, as shown at 106, the method 100 includes forming each of the blade components of the rotor blade 16 from one of the plurality of resin systems.

For example, for the blade segments 21 that form the outer surface of the rotor blade 16, the method 100 may include adding one or more additives, e.g. a colorant, a UV barrier, a de-icing agent, and/or an erosion resistance agent, to the resin system for the blade segments 21 to provide an improved rotor blade. More specifically, surface blade panels may be pigmented with color and/or UV resistance additives to eliminate the need for painting, thereby reducing manufacturing, maintenance, and/or assembly costs. Further, regions at the leading edge 40 of the rotor blade 16 and/or one or more leading edge segments 24 (and possibly the pressure and/or suction side segments 44, 46) may be constructed of a resin system having improved toughness for erosion prevention, e.g. an erosion resistant thermoplastic resin matrix. In addition, de-icing additives may be added to resin systems in specific blade segments 21 which provide improved de-icing properties to the rotor blade 16 without requiring a coating that can easily wear off. In yet another embodiment, various blade components, e.g. the blade tip section 22, may include additives having improved lightning protection features, e.g. improved conductivity. Thus, the resin systems for individual blade components can be easily tailored based upon the location and/or function of that component.

In additional embodiments, the resin systems of one or more of the blade components may include an additive, such as a nucleating agent, which modifies the crystallinity of the resin. More specifically, such additives can alter the forming temperature range of the resin, allow for easier deformation during forming, and/or alter the melting point of the resin, all of which can assist in forming complex blade component shapes. Similarly, one or more additives, e.g. organic silane compounds, may be added to the resin systems to increase the melt flow rate of the blade components that will be thermoplastic welded together, which allows for easier flow of material during welding and potentially stronger welded bonds.

In further embodiments, the resin systems for the blade components may be tailored based on a desired strength of the blade component. For example, as shown in FIG. 2, the step of forming each of the blade components of the rotor blade 16 from the plurality of resin systems may include forming a first set 58 of the blade segments 21 from a thermoset material, forming a second set 60 of the blade segments 21 from a thermoplastic material, arranging the first set 58 of blade segments 21 (e.g. which may be constructed of epoxy) closer to a blade root section 22 of the rotor blade 16, and arranging the second set 60 of blade segments 21 (e.g. which may be constructed of polyester) closer to the blade tip section 22 of the rotor blade 16. Thus, panel resin strength and/or toughness may increase from tip to root with the root having higher resin strength and/or toughness than the tip. Accordingly, higher resin toughness improves fatigue resistance and reduces fatigue damage towards the root.

In additional embodiments, the method 100 may also include forming one or more of the blade components with regions having less volume of the fiber reinforcement material or absent of the fiber reinforcement material. Thus, in such embodiments, the regions may be configured to improve bonding of the blade components to each other. For example, in certain embodiments, as shown in FIGS. 14 and 15, the edges 72 of the blade segments 21 may have less volume of the fiber reinforcement material or may be absent of fiber reinforcement material such that the edges 72 can be easily welded to each other as well as to the main blade structure 15. Further, as shown in FIGS. 14 and 15, the edges 72 of the blade segment(s) 21 may include a continuous strip of non-reinforced resin material or spaced apart strips of non-reinforced resin material such that the blade segment(s) can be easily welded at the edges 72.

In addition, as shown at 108 in FIG. 13, the method 100 includes securing each of the blade components (constructed from the tailored resin systems) together to form the modular rotor blade 16. For example, in one embodiment, the step of securing each of the blade components together may include welding and/or bonding the blade components together to form the modular rotor blade 16. More specifically, in certain embodiments, the method 100 may further include joining adjacent blade segments 21 together via welding, e.g. when the blade segments 21 are constructed, at least in part, of a thermoplastic material and securing the blade segments 21 to the main blade structure 15. For example, as mentioned, the blade segment(s) 21 may include one or more edges 72 of thermoplastic material such that adjacent blade segments can be easily welded together. Alternatively, the blade components may be bonded together, e.g. using an adhesive, one or more mechanical fasteners (not shown), or similar. Thus, the tailored blade components can be easily manufactured and assembled to form the modular rotor blade 16, with each component being designed for a specific function and/or location on the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a modular rotor blade for a wind turbine, the method comprising:
    providing a plurality of different resin systems for manufacturing a plurality of blade segments of the modular rotor blade, each of the plurality of different resin systems comprising at least one of a thermoset material or a thermoplastic material and a fiber reinforcement material and at least one additive, the additive comprising at least one of:
    (i) a colorant,
    (ii) one of an ultraviolet (UV) stabilizer or an ultraviolet (UV) antioxidant, or
    (iii) an organic silane compound,
    the plurality of blade segments comprising pressure side segments, suction side segments, leading edge segments, and trailing edge segments;
    determining a resin system from the plurality of different resin systems for each of the plurality of blade segments based on a location and function of each of the plurality of blade segments by adding at least one of the colorant, or one of the UV stabilizer or the UV antioxidant, or the organic silane compound to the resin system for each of the plurality of blade segments;
    forming each of the plurality of blade segments of the rotor blade from its respective determined resin system; and,
    securing each of the plurality of blade segments together to form the modular rotor blade such that the modular rotor blade is formed of the plurality of different resin systems.

2. The method of claim 1, wherein determining the resin system from the plurality of resin systems for each of the plurality of blade segments based on the location and function of each of the plurality of blade segments further comprises tailoring the resin system for each of the plurality of blade segments based on a predetermined strength of each of the plurality of blade segments.

3. The method of claim 1, wherein forming each of the plurality of blade segments of the rotor blade from the plurality of resin systems further comprises:
    forming, at least in part, a first set of the plurality of blade segments from a thermoset material, and
    forming, at least in part, a second set of the plurality of blade segments from a thermoplastic material.

4. The method of claim 1, further comprising arranging the first set of the plurality of blade segments closer to a blade root of the rotor blade and arranging the second set of the plurality of blade segments closer to a blade tip of the rotor blade.

5. The method of claim 1, wherein the at least one additive further comprises at least one of an ultraviolet (UV) film, an erosion resistance agent, a de-icing agent, a conductivity agent, a nucleating agent, a mold release agent, a lubricant, a sealant, a heat stabilizer, a toughening agent, a plasticizer, a bonding agent, an antimicrobial, a filler, a flame retardant, a smoke retardant, or combinations thereof.

6. The method of claim 5, wherein, if the erosion resistance agent is selected, determining the resin system for each of the blade segments based on the location and function of each of the plurality of blade segments further comprises adding the erosion resistance agent to a resin system of the plurality of different resin systems for at least one segment of the leading edge blade segments, the pressure side segments, or the suction side segments.

7. The method of claim 1, further comprising forming one or more of the blade segments with regions having less volume of the fiber reinforcement material or absent of the fiber reinforcement material, wherein the regions are configured to improve bonding or welding of the blade segments to each other.

8. The method of claim 1, further comprising:
    forming one or more spar caps from a first resin system, and
    forming one or more shear webs from a second resin system, wherein the first resin system comprises a thermoset material and the second resin system comprises a thermoplastic material, a fiber reinforcement material, and at least one additive.

9. The method of claim 1, wherein joining each of the plurality of blade segments together to form the modular rotor blade further comprises at least one of welding or bonding the plurality blade segments together to form the modular rotor blade.

10. A modular rotor blade for a wind turbine, the modular rotor blade comprising:
    a plurality of blade segments, each of the plurality of blade segments constructed from a resin system from multiple resin systems such that the modular rotor blade is formed of the multiple resin systems, each of the resin systems comprising at least one of a thermoset material or a thermoplastic material and a fiber reinforcement material and at least one additive, the additive comprising at least one of a colorant, one of an ultraviolet (UV) stabilizer or an ultraviolet (UV) antioxidant, or an organic silane compound, the plurality of blade segments each comprising:
        a blade root section,
        a blade tip section,
        at least one blade segment arranged between the blade root section and the blade tip section,
        opposing spar caps configured on opposing internal surfaces of the at least one blade segment, and,
        one or more shear webs configured between the opposing spar caps, wherein each of the resin systems for each of the blade segments is determined based on a location and function of each of the plurality of the blade segments by adding at least one of the colorant, one of the UV stabilizer or the UV antioxidant, or the organic silane compound to the resin system of the plurality of resin systems for each of the plurality of blade segments.

11. A modular rotor blade for a wind turbine, comprising:

a main blade structure constructed, at least in part, from at least one of a thermoset or a thermoplastic material; and, a plurality of blade segments configured with the main blade structure, the plurality of blade segments comprising pressure side segments, suction side segments, leading edge segments, and trailing edge segments, the plurality of blade segments being constructed of a resin system from multiple resin systems such that the modular rotor blade is formed of the multiple resin systems, each of the multiple resin systems being determined based on a location and function of each blade segment, each of the multiple resin systems comprising a thermoset material or a thermoplastic material, a fiber reinforcement material, and at least one additive, the at least one additive comprising at least one of a colorant, an ultraviolet (UV) stabilizer or an ultraviolet (UV) antioxidant, or an organic silane compound.

12. The modular rotor blade of claim 11, wherein the at least one additive further comprises at least one of an ultraviolet (UV) film, an erosion resistance agent, a de-icing agent, a conductivity agent, a nucleating agent, a mold release agent, a lubricant, a sealant, a heat stabilizer, a toughening agent, a plasticizer, a bonding agent, an antimicrobial, a filler, a flame retardant, a smoke retardant, or combinations thereof.

13. The modular rotor blade of claim 11, wherein a first set of the blade segments are constructed, at least in part, of a thermoplastic material and a second set of the blade segments are constructed, at least in part, of a thermoset material, wherein the first set of blade segments are located closer to a blade root and the second set of blade segments are located closer to a blade tip.

14. The modular rotor blade of claim 11, wherein one or more of the blade segments comprise regions having less volume of the fiber reinforcement material or absent of the fiber reinforcement material, wherein the regions are configured to improve bonding of the blade segments to each other or to the main blade structure.

15. The modular rotor blade of claim 11, wherein the main blade structure comprises at least one of a blade root section, a blade tip section, one or more one or more continuous spar caps, one or more shear webs, or an additional structural component secured to the blade root section and configured within the at least one blade segment.

16. The modular rotor blade of claim 11, wherein the fiber reinforcement material comprises at least one of glass fibers, carbon fibers, polymer fibers, ceramic fibers, nanofibers, or metal fibers.

17. The modular rotor blade of claim 11, wherein the plurality of blade segments comprise at least one of a pressure side segment, a suction side segment, a leading edge segment, a trailing edge segment, a non-jointed segment, a J-shaped blade segment, or a single-jointed segment.

* * * * *